INVENTORS:
Richard E. Stegler &
Coleman Raphael
BY: John J. Sullivan
ATTORNEY.

United States Patent Office 3,107,195
Patented Oct. 15, 1963

3,107,195
METHOD AND MEANS FOR MAKING LAP JOINTS
Richard E. Stegler, Huntington, and Coleman Raphael, Glen Cove, N.Y., assignors to Republic Aviation Corporation, near Farmingdale, N.Y., a corporation of Delaware
Filed Apr. 15, 1960, Ser. No. 22,469
12 Claims. (Cl. 161—36)

This invention relates to the connection of structural members and, more particularly, to a method of and means for connecting overlapping structural members to form lap joints having high load-carrying capabilities.

Among other things, the present invention proposes a lap joint and the method of making the same which contemplates connecting means having a composite shear strength and extensibility formulation to the end that its effective shear strength is equal to or greater than the yield strength of the weaker of the particular members joined.

Additionally, the instant invention contemplates the fabrication of a lap joint and connecting means incorporated therein by which the load-carrying characteristics of the connecting means are made compatible with and to correspond to the distribution of stresses in the members joined. In this way each point across the connecting means of the joint fails at approximately the same instant under an application of a sufficient shear load on the connecting means through the parts so joined.

More specifically, the present lap joint includes connecting means so constituted and arranged that the ultimate joint has variable flexibility in the direction of the primary load to be applied. Thus, connecting means of varying strength and rigidity across the lap joint is provided with the location of such strength and rigidity variations pre-established to substantially coincide with the distribution of stress over the entire lap area and thereby produce maximum joint strength.

The present invention recognizes a relationship between the shear strength and extensibility of the connecting agent in a lap joint and the inherent elasticity of the structural members. It is proposed to more closely match such qualities than heretofore accomplished in prior lap joints. For example, by progressively decreasing the shear strength of the connecting means from the central area of the lap outwardly with an attendant increase in its extensibility or flexibility, tension loads applied on the joined parts are applied uniformly in the form of shear across the entire joint as opposed to being applied principally to any localized point or portion of the joint. Thus, the total strength of the joint becomes a function of the length of overlap established by the joint rather than limited to some maximum strength regardless of the length of overlap as in prior constructions.

Where the joined members are of comparable dimensions and comprise materials of the same strength and modulus of elasticity, the location of the area of maximum shear strength, i.e., rigidity in the connecting means, is symmetrically arranged at the substantial center of the lap joint. As these characteristics of the joined members vary, the location of maximum shear strength of the connecting means is adjusted accordingly relative to the center of the joint. In every case, however, the strength of the connecting means decreases from the established maximum strength area outwardly of the joint. Thus, the weakest shear location of the connecting means is adjacent the outer ends of the lap joint.

With the above and other objects in view, as will be apparent, this invention consists in the several steps or operations, as well as in the construction, combination and arrangement of parts, all as hereinafter more particularly described, claimed and illustrated in the accompanying drawings wherein:

Figure 1:
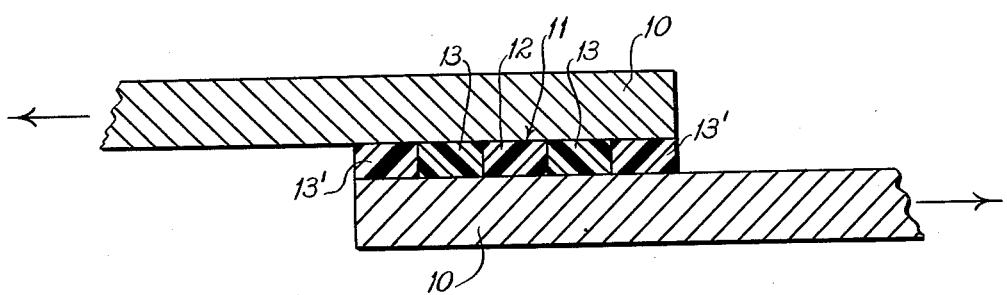
FIG. 1 is a section parallel to the direction of loading cut through a lap joint fabricated in accordance with the teachings of this invention to show a preferred form of connecting means, viz., an adhesive, applied in contiguous transverse strips of decreasing shear strength and increasing extensibility medially of the joint outwardly with reference to the center of overlap.
Figure 3:
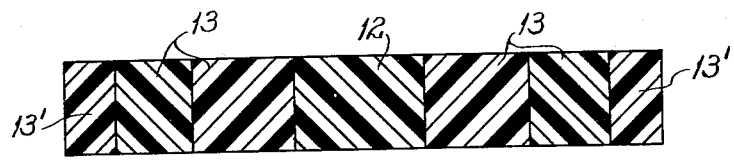
FIG. 3 is a similar view with the carrier omitted to show adhesive strips of varying cross-sectional dimensions whereby varying strength and extensibility characteristics may be achieved, in addition to selected, specific adhesive formulations.

Referring more particularly to the drawings, 10 designates the end portions of a pair of structural members disposed in overlapped relation and joined one to the other to create a lap joint. The primary load is to be applied to the joint in the direction of the arrows (FIG. 1). Connecting means, preferably an adhesive 11, is sandwiched between and connects adjacent or faying surfaces of the members 10 one to the other. The adhesive 11 is so constituted and arranged as to create its strongest and most rigid connection in an area 12 medially of the joint. From this medial area 12 outwardly of the joint, the adhesive 11 is constituted of contiguously disposed formulations 13 having progressively greater elongtion characteristics locating the most flexible or extensible connection 13' at and adjacent the extremities of the members 10. The bonding qualities of the adhesive 11 may be additionally controlled by appropriately varying the bonding area, i.e., the breadth, of each formulation or strip 12, 13 and 13' (FIG. 3).

Figure 4:
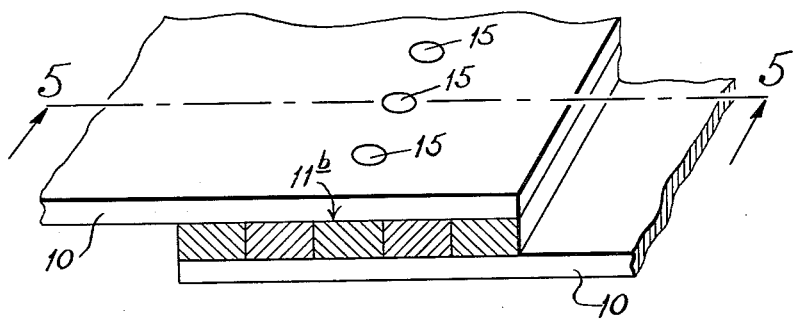
FIG. 4 is a fragmentary isometric view showing a section of another form of connecting means, viz., a combination adhesive or bond applied in contiguous strips across the joint and a row of high strength fasteners adjacent the joint center.
Figure 5:
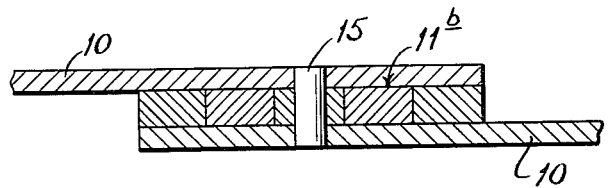
FIG. 5 is a section taken along line 5—5 of FIG. 4.

It is to be understood that while an adhesive is illustrated as the preferred connecting means, the invention contemplates spot welding, brazing, soldering, bolting, etc., in short, any connecting means. In spot welding, for example, the technique underlying the invention is practiced by varying the spot weld post heating cycle to create relatively weak and highly ductile welds at the ends of the joint progressing to high strength, low ductility welds at the center. This same result can be accomplished in brazing or soldering by varying the alloy contents of the joining material. In riveted or bolted lap joints, on the other hand, the fastener size and/or material and/or geometry (i.e., spacing) is varied to arrive at the desired distribution of variations in deflection and shear load-carrying capabilities. A combination of such connecting means, as illustrated in FIGS. 4 and 5, may also be employed, for example, by combining adhesive bonds 11 or highly ductile brazing or soldering 11b at the joint ends with the use of a close tolerance, rigid, high strength fastener such as a pin or pins 15 at the joint center.

In the preferred form of the invention, the lap joint is produced by initially performing an elastic analysis of the particular joint to establish the shear load distribution across the joint upon an application of tension load on the joined members. From this analysis a selected range of adhesives of known or determined shear strengths is established to correspond to the computed load distribution. This range may also be established by selecting a single adhesive as a base and modifying it by changing the quantities or qualities of certain components in its formulation so as to either increase or decrease its stiffness, hence, strength.

The adjacent surfaces of the members 10 to be joined are treated to give them the desired tensile strength as well as an affinity to the adhesive material and thereby insure a good structural bond or connection. The selected adhesive formulations or group of adhesives are then applied to the surface of one or both of the members 10 thus treated in adjacent or contiguous strips 12, 13 and 13' having the desired varying rigidity and elongation qualities. The several strips 12, 13 and 13' are disposed perpendicular to the direction of the primary load to be applied to the ultimate lap joint.

After it has been thus applied to the surfaces to be joined, the adhesive 11 when used in semi-liquid or paste form is wiped in or doctored to provide a smooth and unbroken surface or surfaces and to eliminate air entrapment. The surfaces are now placed in intimate contact and the adhesive is cured or otherwise made to set to produce the ultimate joint assembly.

Figure 2:
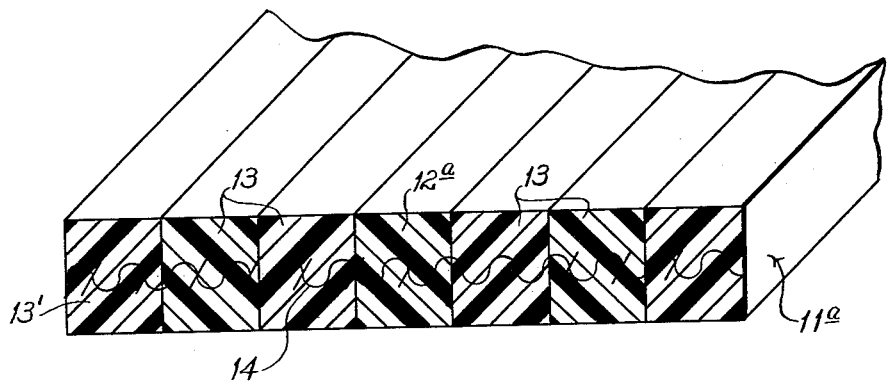
FIG. 2 is a fragmentary isometric view showing a section of the connecting means similar to that illustrated in FIG. 1, but modified to include a carrier, i.e., wire mesh, fabric, etc., for the adhesive by which it may be prefabricated in the form of a tape or sheet to a selected, variable shear strength and extensibility formulation.

The adhesive connecting means may also be fabricated in a tape form as at 11a (FIG. 2). In such case, a carrier such as, for example, scrim cloth 14 is impregnated with an adhesive or combination of different adhesives in selected formulations or strips as above from the center area 12a outwardly. When the tape 11a is thus prepared, the surfaces of the members 10 are treated as stated above and the tape disposed therebetween with the center area 12a of the tape 11a located medially of the lap joint in a selected position with reference to the center of the lap as required by the relative dimensions of the members 10 and the strength and elastic characteristics of the material thereof. With the tape thus positioned, it is cured or made to set as determined by the particular adhesive or adhesives employed. In any case, the members 10 become secured one to the other by connecting means of variable flexibility across the joint transversely of the direction of load to produce an ultimate lap joint characterized by its high load-carrying capabilities.

In a specific test which proved the feasibility of the present inventive concept, steel specimens (specifically, an H-11 series of steel, which is an alloy of iron and 5% chromium, 1.5% molybdenum, 0.4% vanadium, 0.35% carbon) were employed. These specimens were each one inch wide, nine inches long, and 0.040 gauge. Prior to bonding, the specimens were heat treated to approximately 240,000 p.s.i. tensile yield strength and 280,000 p.s.i. tensile ultimate strength. The surfaces to be connected were then cleaned by vapor degreasing them, sandblasting to roughen them and insure a good mechanical interlock and finally coated with a primer.

The specimens were thereafter disposed in a six-inch overlap position and bonded one to the other by a composite adhesive having the following formulations: at the center of the lap a strip of epoxy phenolic-type adhesive was applied; adjacent either side of this central area outwardly of the lap successive strips of vinyl-phenolic-type adhesive, nitril-phenolic-type adhesive, and an aluminum-filled epoxy-type adhesive modified by a synthetic elastomer were employed, in that order. The bonding was effected by curing at temperature and pressure following standard or conventional practices.

In a second specific test to confirm the results obtained above, an aluminum-filled epoxy-type adhesive was employed at the center of the lap joint with adjacent strips of the same epoxy-type adhesive modified by flexibilizing additives (e.g., synthetic elastomer) in increasing parts outwardly to the ends of the joined members. In other respects this test followed the same procedure as explained above in connection with the first test.

From both of the foregoing tests it was concluded that a composite adhesive having relatively less shear strength and increasing flexibility from the central area of the overlap outwardly produces a stronger shear strength lap joint than one employing any one adhesive of the adhesives used. It was further concluded that this is true whether the composite adhesive consists of a basic, relatively high strength adhesive modified by increasing parts of flexibilizing material or multiple different adhesives of varying strengths and extensibility.

It is to be understood that where the members 10 are of materials having the same or similar strength and modulus of elasticity (as in the tests referred to above and as illustrated by way of example in FIG. 1), the point or area of lowest strain, i.e., area or strip 12 and 12a, coincides with the center of the overlap of the members 10 (center with reference to the direction of primary load). Where, on the other hand, the members 10 are of different dimensions and/or dissimilar strengths and/or moduli of elasticity, the area or strip 12 and 12a is located to one side or the other relative to the center of overlap of the members 12.

What is claimed is:

1. In a lap joint for structural members, connecting means comprising individual strips of adhesive each constituted of ingredient formulations having progressively less shear strength and greater extensibility from an established maximum strength area medially of the joint outwardly sandwiched between faying surfaces of the members and contiguously disposed at and along the joint substantially perpendicular to the direction of load to be applied.

2. In a lap joint for structural members, connecting means comprising a composite adhesive formed by contiguous strips of ingredient formulations having decreasing shear strength and increasing elongation characteristics and cross-sectional area from a selected area medially of the joint outwardly, said strips being located between said members and transversely of the joint relative to the direction of primary load.

3. In a lap joint, connecting means comprising a composite adhesive constituted of ingredient formulations of progressively weaker shear strength and greater elongation and cross-sectional area medially of the joint outwardly with reference to the direction of primary load.

4. In a lap joint for structural members, connecting means comprising a tape formed by a carrier impregnated with an adhesive disposed thereon in multiple strips, the successive strips being constituted of ingredient formulations having decreasing shear strength and increasing extensibility from a selected area medially of the joint outwardly, said tape being disposed between faying surfaces of said members and transversely of the lap joint with reference to the primary load to be applied thereto.

5. In a lap joint for structural members, a composite connecting means disposed between adjacent surfaces of said members and transversely of the joint relative to the direction of the primary load to be applied thereto, said means being formed by successive strips of material each constituted of ingredients having decreasing shear strength and increasing extensibility from the area of lowest strain of the joint outwardly.

6. In a lap joint, composite connecting means comprising a plurality of substantially contiguously located adhesive strips disposed entirely between faying surfaces of the joint and transversely of the joint relative to the direction of primary load, the strip in a selected area medially of the joint being constituted of ingredients having greater shear strength and less extensibility relative to the remaining strips outwardly thereof, and at least one pin of selected size and material through the joint in the area of the stronger strip aforesaid.

7. The method of making a lap joint consisting in formulating a selected range of adhesives having varying shear strengths, applying said adhesives in substantially contiguous strips to the surface of a first member, said strips being disposed transverse to the direction of primary load to be applied to the ultimate joint and in progressively decreasing shear strength order from a selected area medially of said joint outwardly, placing the surface of a second member in abutment against and overlapping relation with the treated surface aforesaid of the first member, and holding the members so disposed until secured one to the other.

8. The method of making a lap joint consisting in formulating adhesives having different shear strengths and extensibility characteristics, impregnating a carrier with said adhesives in contiguous strips in decreasing shear strength and increasing extensibility order from a selected area of the carrier outwardly in both directions to form a composite bonding tape, disposing said tape between and in intimate abutting contact with the marginal surfaces of a pair of members in overlapping relation with said strips located transverse to the direction of load to be applied to the members when ultimately joined, and retaining the members so disposed until the adhesive material becomes set.

9. The method of making a lap joint between a pair of structural members consisting in applying a strip of adhesive formulated of relatively high shear strength ingredients at and along a selected area of one of the members to be joined, applying successive substantially contiguous strips of adhesives formulated of progressively weaker shear strength and greater extensibility at and along areas adjacent both sides of said selected area, disposing the other member to be joined in abutting contact with the areas of said one member treated as aforesaid and retaining the members so disposed until the adhesives become set.

10. The method of making a lap joint consisting in formulating an adhesive having a relatively high strength and low extensibility, applying said adhesive in a strip at and along an area of a first member, applying successive substantially contiguous strips of the same adhesive adjacent both sides of said first strip, the adhesive of each successive strip being modified by an increased amount of a flexibilizing additive, disposing an area of a second member in abutting contact with the several strips aforesaid, and retaining said members so disposed until the adhesive of all the strips becomes set.

11. The method of making a lap joint consisting in forming a carrier of cloth, impregnating the cloth with multiple strips of adhesive of decreasing shear strength and increasing extensibility formulations from substantially the center thereof outwardly to form a composite bonding tape, placing the tape between the overlapped portions of a pair of structural members to be joined with the center of the tape medially of the overlap, and retaining the members and tape thus disposed in intimate contact until secured one to the other.

12. The method of making connecting means for use in lap joints consisting in forming a scrim cloth carrier to the dimensions of the lap joint, impregnating the cloth with multiple strips of adhesive of decreasing shear strength and increasing extensibility formulations from a selected area medially of the cloth outwardly, placing the cloth so impregnated across the lap joint with the strips disposed transverse to the direction of primary load to be applied to the lap joint, and maintaining the cloth thus disposed until the adhesive sets and the lap joint thereby formed.

References Cited in the file of this patent

UNITED STATES PATENTS

| | | |
|---|---|---|
| 693,514 | Haberstroh | Feb. 18, 1902 |
| 1,731,469 | Mansfield | Oct. 15, 1929 |
| 2,115,368 | Lustberg | Apr. 26, 1938 |
| 2,294,347 | Bauer | Aug. 25, 1942 |
| 2,343,117 | Vincent | Feb. 29, 1944 |
| 2,510,727 | Sussenback | Jan. 6, 1950 |
| 2,624,886 | Herman | Jan. 13, 1953 |
| 2,679,305 | Gunthorp | May 25, 1954 |
| 2,679,468 | Pitman | May 25, 1954 |